United States Patent
Billy et al.

(10) Patent No.: US 10,259,277 B2
(45) Date of Patent: Apr. 16, 2019

(54) WHEEL ELECTRONIC UNIT AND METHOD OF MOUNTING SAME

(71) Applicants: Continental Automotive France, Toulouse (FR); Continental Automotive GmbH, Hannover (DE)

(72) Inventors: Stéphane Billy, Grenade (FR); Jean-Christophe Bouthinon, Cugnaux (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 15/765,098

(22) PCT Filed: Aug. 26, 2016

(86) PCT No.: PCT/EP2016/001438
§ 371 (c)(1),
(2) Date: Mar. 30, 2018

(87) PCT Pub. No.: WO2017/059938
PCT Pub. Date: Apr. 13, 2017

(65) Prior Publication Data
US 2018/0272816 A1 Sep. 27, 2018

(30) Foreign Application Priority Data
Oct. 7, 2015 (FR) .................................... 15 59533

(51) Int. Cl.
*B60C 23/04* (2006.01)
(52) U.S. Cl.
CPC ...... *B60C 23/0488* (2013.01); *B60C 23/0493* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS

| 2006/0044125 A1 | 3/2006 | Pierbon |
| 2006/0161327 A1 | 7/2006 | Emmerich et al. |

(Continued)

FOREIGN PATENT DOCUMENTS

| DE | 102005002240 A1 | 7/2006 |
| FR | 2847667 A1 | 5/2004 |

(Continued)

OTHER PUBLICATIONS

English translation of the Written Opinion for International Application No. PCT/EP2016/001438, dated Nov. 8, 2016, 5 pages.
(Continued)

*Primary Examiner* — Andre J Allen
(74) *Attorney, Agent, or Firm* — RatnerPrestia

(57) ABSTRACT

An electronic unit for measuring operating parameters of a tire, the tire being mounted on a rim, the mounted assembly forming a vehicle wheel able to rotate about an axis of rolling, the electronic unit includes a support designed to be mounted on the wheel, the support forming a printed circuit on which there is mounted a radial-acceleration sensor able to measure radial accelerations of the wheel, the radial-acceleration sensor being mounted inclined in an angular range from 30 to 60 degrees with respect to a plane tangential to the rim.

16 Claims, 4 Drawing Sheets

(58) Field of Classification Search
CPC ...... G01M 17/024; G01M 17/10; G01M 7/08;
G01M 17/0076; G01M 17/013; G01M
17/03; G01M 17/04; G01M 17/06; G01M
17/08; G01M 1/02
USPC .................................................. 73/146–146.8
See application file for complete search history.

(56) References Cited

U.S. PATENT DOCUMENTS

| | | | |
|---|---|---|---|
| 2013/0169428 A1* | 7/2013 | Shima | B60C 23/0416 340/447 |
| 2013/0179113 A1 | 7/2013 | Guinart | |
| 2014/0371980 A1* | 12/2014 | Sekizawa | B60C 23/0416 701/34.4 |
| 2016/0318355 A1 | 11/2016 | Guinart et al. | |
| 2018/0201075 A1* | 7/2018 | Alexander | G07C 5/0808 |

FOREIGN PATENT DOCUMENTS

| | | | |
|---|---|---|---|
| WO | 2012045917 A1 | 4/2012 | |
| WO | 2015090554 A1 | 6/2015 | |

OTHER PUBLICATIONS

International Search Report and Written Opinion for International Application No. PCT/EP2016/001438, dated Nov. 8, 2016, 7 pages.

* cited by examiner

Prior Art

WHEEL ELECTRONIC UNIT AND METHOD OF MOUNTING SAME

CROSS REFERENCE TO RELATED APPLICATIONS

This application is the U.S. National Phase Application of PCT International Application No. PCT/EP2016/001438, filed Aug. 26, 2016, which claims priority to French Patent Application No. 1559533, filed Oct. 7, 2015, the contents of such applications being incorporated by reference herein.

FIELD OF THE INVENTION

The present invention pertains to the automotive sector. More precisely, the invention relates to a method of mounting an electronic unit for measuring operating parameters of a tire of a wheel of a vehicle and such a unit.

BACKGROUND OF THE INVENTION

It is known that measurements of operating parameters of a tire of a wheel of a vehicle are performed by sensors mounted in electronic housings, so-called "wheel unit", of a system for checking the pressure of the tires, of the type known by the name "TPMS" (initials standing for "Tyre Pressure Monitoring System").

In a known manner, the wheel units comprise, generally, a microprocessor, a memory, a radiofrequency emitter, a power supply battery and at least one radial acceleration sensor able to measure the radial accelerations of the wheel and mounted on a support (forming a printed circuit or "PCB" standing for "Printed Circuit Board"). In the present disclosure, the expression "electronic unit 10" refers to the assembly formed by the radial acceleration sensor and the support of a wheel unit.

A first mode of integration of such an electronic unit into a wheel is represented in FIG. 1A. In FIG. 1A, an electronic unit 10 is mounted on a rim 21 of a wheel 20. The wheel 20 is configured to rotate about a rolling axis. The electronic unit 10 comprises a radial acceleration sensor 12 which measures the radial acceleration that it undergoes over a wheel revolution when the wheel 20 rotates in the direction of rotation illustrated by the arrow 30 around the rolling axis, for example at the positions A1, A2, A3 and A4 such as illustrated in FIGS. 1A and 1B. These measurements are preferentially carried out at fixed frequency.

According to FIG. 1A, the electronic unit 10 therefore also comprises a support 11 forming a printed circuit on which the radial acceleration sensor 12 is mounted. As illustrated in FIG. 1A, the support 11 is mounted on the rim 21 tangentially and parallel to the rolling axis of the wheel 20. The radial acceleration sensor 12 is mounted on the support 11, and measures the accelerations perpendicular to the rolling axis of the wheel 20. This first mode of integration of the electronic unit 10 makes it possible to measure the radial acceleration of the wheel 20 when the vehicle is moving. This radial acceleration is the resultant of two radial components, namely a first component which corresponds to the projection of the gravitational acceleration in the direction of measurement of the radial acceleration sensor 12 and a second component which corresponds to the centrifugal acceleration in the same direction of measurement of the radial acceleration sensor 12.

On the basis of the radial acceleration measurements, it is possible to draw a curve Acc(t) of acceleration as a function of time as illustrated in FIG. 1B. This curve Acc(t) is a sinusoid whose minimum MIN corresponds to the positioning of the radial acceleration sensor 12 in position A1 at 0 degrees with respect to the top of the rim and the maximum MAX corresponds to the positioning of the radial acceleration sensor 12 in position A3 at 180 degrees with respect to the top of the rim.

A numerical processing of these radial acceleration measurements by a processor (not represented) of the electronic unit 10 makes it possible to determine the value MIN of the radial acceleration and therefore the transit of the radial acceleration sensor 12 at the position A1 and/or the value MAX of the radial acceleration and therefore the transit of the radial acceleration sensor 12 at the position A3.

On the basis of these radial acceleration measurement data, it is therefore possible, through appropriate numerical processing, to ascertain the transit of the wheel unit and consequently of the electronic unit 10 at the positions A1 and/or A3 on the wheel 20.

A second mode of integration of such an electronic unit in a wheel is represented in FIG. 2. In FIG. 2, the electronic unit 10 is also mounted on the rim 21 of the wheel 20. The electronic unit 10 comprises a radial acceleration sensor 12 which measures the radial acceleration over a wheel revolution when the wheel 20 rotates in the direction of rotation illustrated by the arrow 30 around the rolling axis such as described previously. According to FIG. 2, the electronic unit 10 also comprises a support 11 forming a printed circuit on which the radial acceleration sensor 12 is mounted. As illustrated in FIG. 2, the support 11 is mounted on the rim 21 in a radial plane of the wheel 20, that is to say a plane containing the rolling axis of the wheel 20. The radial acceleration sensor 12 is mounted perpendicular to the plane of the support 11, that is to say in a manner perpendicular to the plane containing the rolling axis of the wheel 20. This second mode of integration of the electronic unit 10 also makes it possible to measure the radial acceleration of the wheel 20 such as described previously, when the vehicle is moving.

On the basis of the radial acceleration measurements, it is also possible to draw, as a function of the time, the acceleration curve Acc(t) of FIG. 1B.

In the two previous modes of integration of the electronic unit 10 according to FIGS. 1A, 1B and 2, it is noted that the radial acceleration sensor 12 is mounted perpendicular to the plane of the rim 21, the plane of the rim 21 corresponding to the plane of FIGS. 1A and 2, that is to say a plane perpendicular to the rolling axis of the wheel 20. This implies that each mode of integration of the electronic unit 10 requires a specific arrangement of the radial acceleration sensor 12 with respect to the support 11. Indeed, in the first mode of integration the radial acceleration sensor 12 is mounted parallel to the support 11, while in the second mode of integration the radial acceleration sensor 12 is mounted perpendicular to the support 11.

In order to be able to cover the two previous modes of integration of the electronic unit 10 according to FIGS. 1A, 1B and 2, it is necessary to have two different arrangements of electronic unit, each being specifically suitable for a mode of integration of the electronic unit 10 in the wheel 20. It is therefore not possible to use a single arrangement of electronic unit 10 which makes it possible to cover the two previous modes of arrangement of the electronic unit 10 in the wheel 20.

This drawback is particularly inconvenient since it is expensive and it limits the choices of integration of an electronic unit when it is desired to reduce the costs related to the wheel units present in a vehicle.

SUMMARY OF THE INVENTION

An aspect of the invention is aimed at removing, or at least attenuating, all or some of the aforementioned drawbacks of the prior art.

The aim of a first aspect of the present invention is then to propose an electronic unit making it possible to circumvent the integration constraints of the prior art.

The first aspect of the present invention makes it possible to decrease the costs related to the wheel units present in a vehicle since a single arrangement is required to cover all the modes of integration of an electronic unit.

A second aspect of the present invention is aimed at proposing a method of mounting a radial acceleration sensor in an electronic unit.

A third aspect of the present invention is aimed at proposing a method of mounting an electronic unit in a wheel of a vehicle.

Such methods according to aspects of the present invention are aimed at allowing the realization of a single electronic unit able to be mounted on a wheel with no limitation of integration.

For this purpose, an aspect of the present invention proposes a first electronic unit for measuring operating parameters of a tire mounted on a rim, the mounted assembly forming a vehicle wheel able to rotate about a rolling axis, said electronic unit comprising a support adapted to be mounted on said wheel, said support forming a printed circuit on which is mounted a radial acceleration sensor able to measure radial accelerations of said wheel. According to an aspect of the present invention, said radial acceleration sensor is mounted inclined in an angular span of 30 to 60 degrees with respect to a tangential plane of said rim.

Advantageously, said support of the first electronic unit is mounted substantially parallel or perpendicular to a plane perpendicular to said rolling axis of said wheel.

An aspect of the present invention relates furthermore to a second electronic unit for measuring operating parameters of a tire, said tire being mounted on a rim, the mounted assembly forming a vehicle wheel able to rotate about a rolling axis, said electronic unit comprising a support adapted to be mounted on said wheel, said support forming a printed circuit on which is mounted a radial acceleration sensor able to measure radial accelerations of said wheel. According to an aspect of the present invention, said support is mounted inclined in an angular span of 30 to 60 degrees with respect to a tangential plane of said rim.

Advantageously, said radial acceleration sensor of the second electronic unit is mounted substantially parallel or perpendicular with respect to the plane of said support.

Tests have shown that the first electronic unit and the second electronic unit make it possible to measure the gravitational acceleration and the centrifugal acceleration which are required in order to determine the radial acceleration of a vehicle wheel. Furthermore, the unique arrangement of the electronic unit makes it possible to integrate a wheel unit in various ways without limitation.

An advantageous embodiment of the first electronic unit and of the second electronic unit provides that said support or said radial acceleration sensor is mounted at 45 degrees with respect to a plane tangential to said rim.

An aspect of the present invention also relates to a system for checking the pressure of the tires of a vehicle comprising at least one electronic unit, such as the first electronic unit or the second electronic unit.

An aspect of the present invention also relates to a system for checking the pressure of the tires of a vehicle comprising two electronic units such as described previously, a first electronic unit in which the radial acceleration sensor or the support is mounted inclined in an angular span of 30 to 60 degrees with respect to the tangential plane with respect to an axis of pivoting of this tangential plane parallel to the rolling axis of the wheel and a second electronic unit in which the radial acceleration sensor or the support is mounted inclined in an angular span of 30 to 60 degrees with respect to the tangential plane around an axis of this tangential plane also belonging to the plane of the rim, the first electronic unit and the second electronic unit being mounted on one and the same support inside a volume such as a sphere.

An aspect of the present invention relates furthermore to a wheel of a vehicle comprising the first electronic unit or the second electronic unit.

An aspect of the present invention also envisages a method of mounting a radial acceleration sensor able to measure radial accelerations of a vehicle wheel able to rotate about a rolling axis, said radial acceleration sensor being able to be mounted in an electronic unit for measuring operating parameters of a tire, said tire being mounted on a rim, the mounted assembly forming said wheel, said electronic unit comprising a support forming a printed circuit and adapted to be mounted on said wheel. According to an aspect of the present invention, the method comprises a step consisting in mounting said radial acceleration sensor with an inclination of between 30 and 60 degrees with respect to a plane tangential to said rim.

Advantageously, the first method furthermore consists in mounting said support, substantially parallel or perpendicular to a plane perpendicular to said rolling axis of said wheel.

Finally, an aspect of the present invention furthermore envisages a method of mounting an electronic unit for measuring operating parameters of a tire, said tire being mounted on a rim, the mounted assembly forming a vehicle wheel able to rotate about a rolling axis, said electronic unit comprising a support adapted to be mounted on said wheel, said support forming a printed circuit on which is mounted a radial acceleration sensor able to measure radial accelerations of said wheel. According to an aspect of the present invention, the second method comprises a step consisting in mounting said support with an inclination of between 30 and 60 degrees with respect to a plane tangential to said rim.

Advantageously, the second method furthermore consists in mounting said radial acceleration sensor, substantially parallel or perpendicular with respect to the plane of said support.

Tests have shown that the first method and the second method allow the realization of a unique arrangement of the electronic unit making it possible to integrate a wheel unit in various ways without limitation.

BRIEF DESCRIPTION OF THE DRAWINGS

Details and advantages of the present invention will become better apparent on reading the description which follows, given with reference to the appended schematic drawings in which.

DETAILED DESCRIPTION OF THE PREFERRED EMBODIMENTS

Figure 1A:
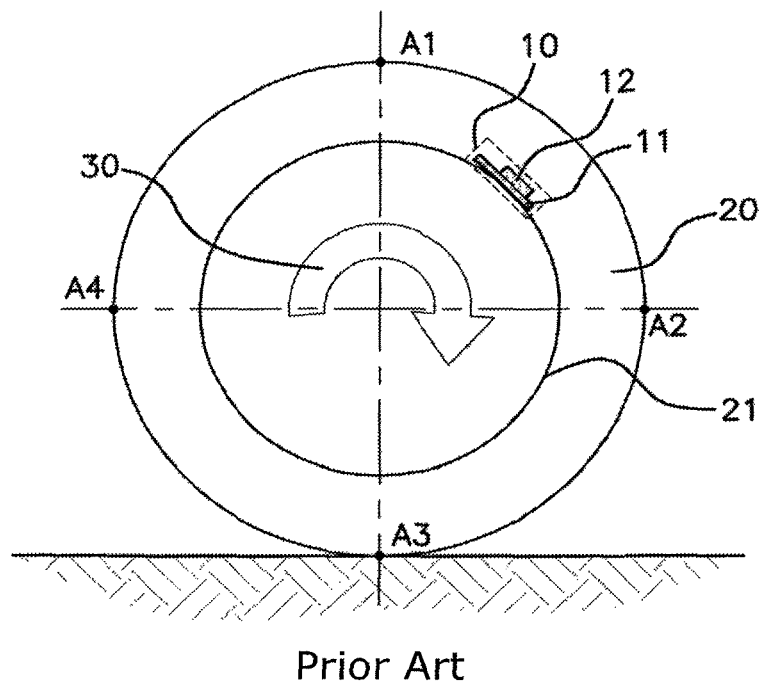
FIGS. 1 (1A and 1B) is a diagram of an electronic unit of the prior art arranged according to a first mode of integration.
Figure 1B:
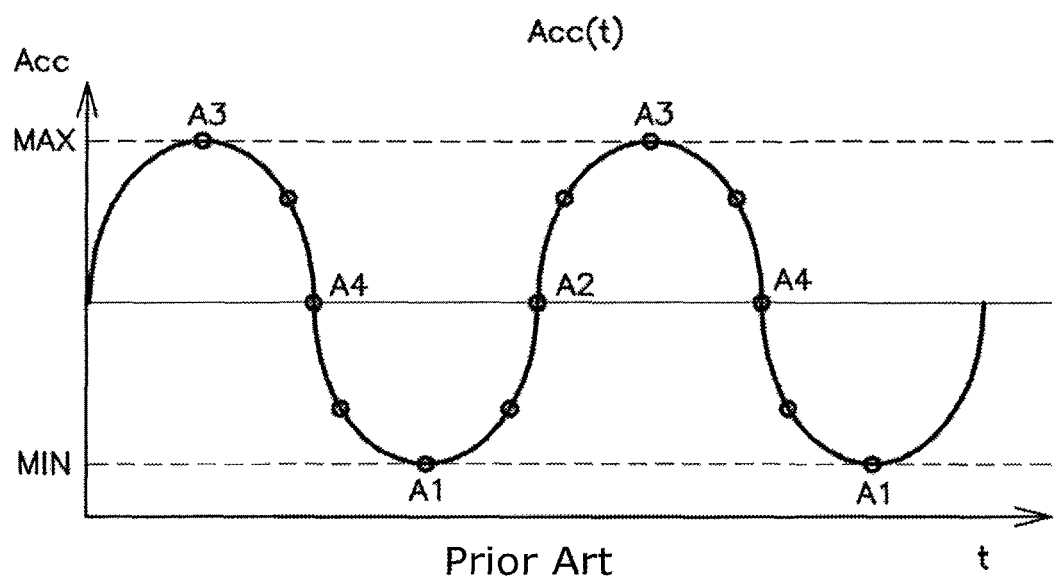
Figure 2:
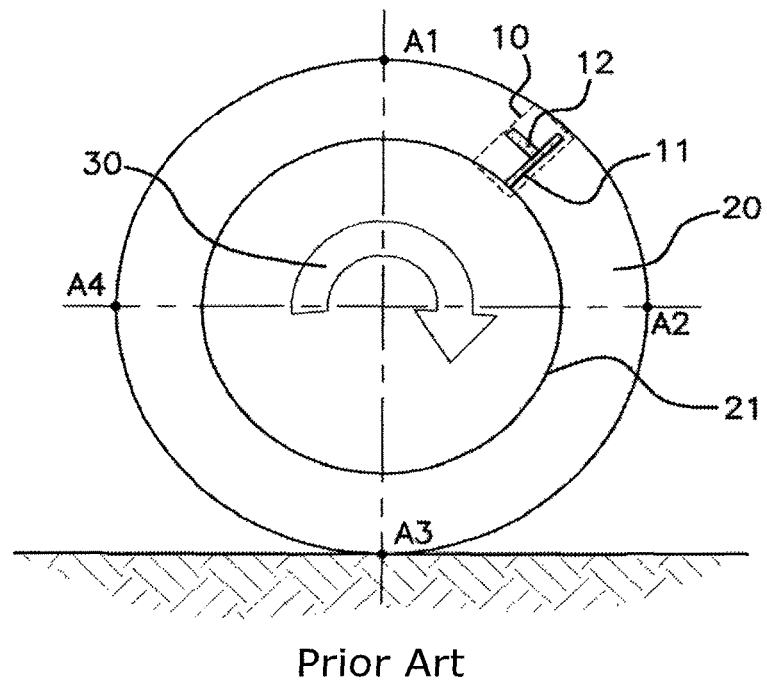
FIG. 2 is a diagram of an electronic unit of the prior art arranged according to a second mode of integration, FIGS. 3 (3A and 3B) is a diagram of an electronic unit according to a first embodiment of the invention.
Figure 3A:
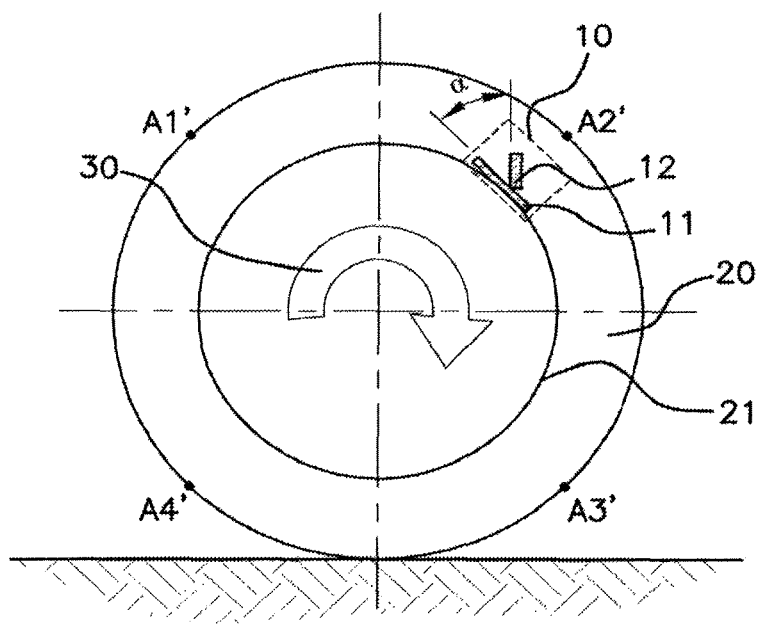
Figure 3B:
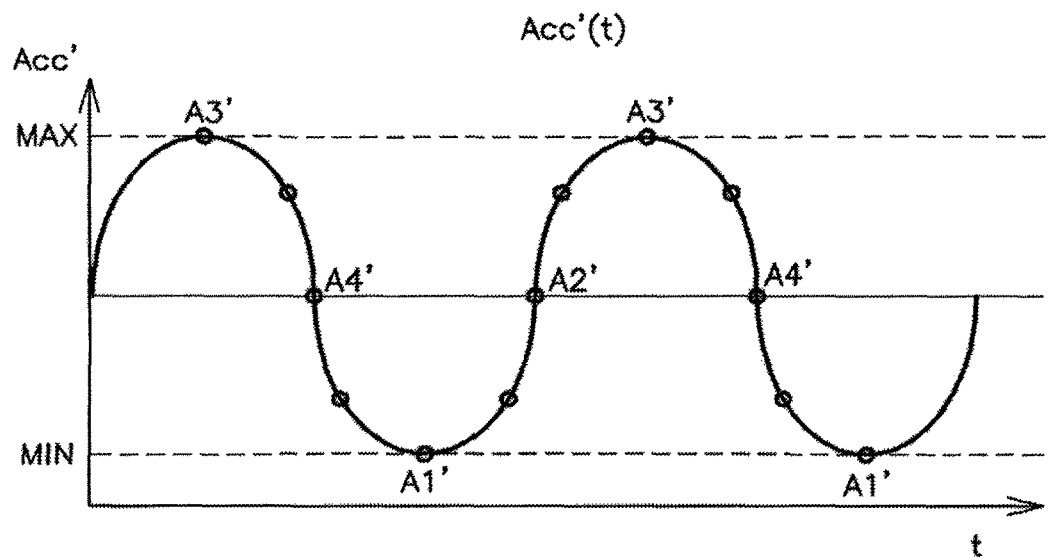
Figure 4:
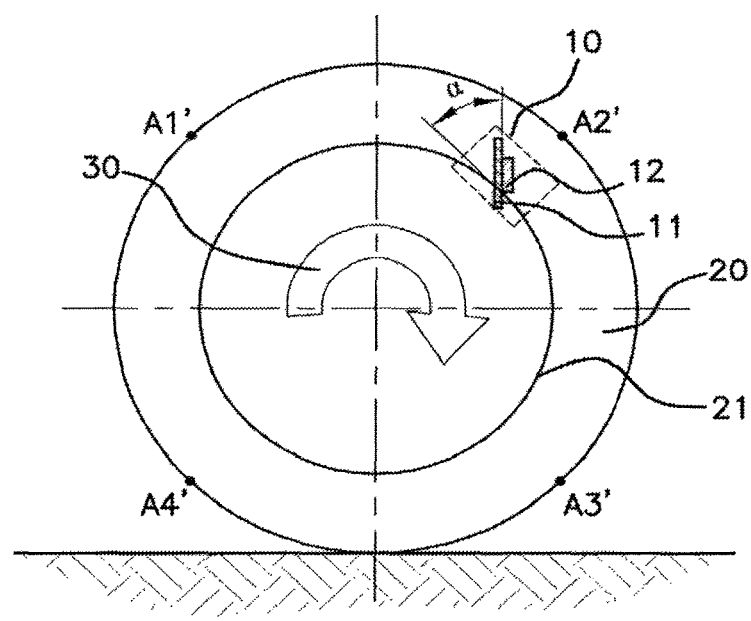
FIG. 4 is a diagram of an electronic unit according to a second embodiment of the invention.
Figure 7:
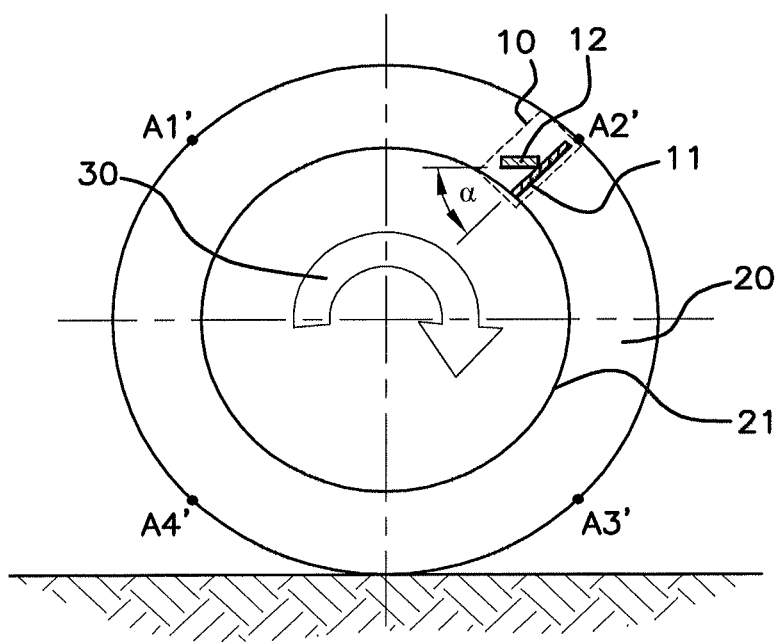
FIG. 7 is a diagram of the electronic unit of FIG. 3 according to another embodiment of the invention.

In the description which follows, FIGS. 1 to 4 and 7 illustrate very schematically a vehicle wheel 20 equipped with an electronic unit 10 such as described previously. In FIGS. 1A and 2 is shown an electronic unit 10 known in the prior art, while in FIGS. 3, 4 and 7 is shown an electronic unit 10 according to an aspect of the present invention. The wheel 20 and the electronic unit 10 are not shown to the same scale. It is assumed that the wheel 20 rotates in the direction indicated by the arrow 30 and that the corresponding vehicle moves forwards.

As illustrated in FIG. 3A, the first electronic unit 10 according to an aspect of the invention is able to measure operating parameters, such as for example a pressure or a temperature, of a tire (not represented) mounted on a rim 21, the mounted assembly forming a wheel 20 of a vehicle (not represented).

In FIG. 3A, an electronic unit 10 comprises a support 11 adapted to be mounted on the wheel 20 such as described previously. In the example of FIG. 3A, the support 11 is mounted tangentially in a plane parallel to the rolling axis of the wheel 20 (and perpendicularly to the plane of the figure).

The support 11 is formed here by a printed circuit such as a printed circuit board (known also by the initials "PCB") on which a radial acceleration sensor 12 is mounted.

For example, the support 11 is a printed circuit board of a pressure sensor placed in the tire associated with the wheel 20 within the framework of a TPMS system. Indeed, the TPMS system is now compulsory, in Europe and also in the United States, on all new models of motorized vehicles.

The radial acceleration sensor 12 of FIG. 3A is configured to measure the radial acceleration that it undergoes over a wheel revolution when the wheel 20 rotates in the direction of rotation illustrated by the arrow 30 around the rolling axis, for example at the positions A1', A2', A3' and A4'. Of course, other positions of measurements other than the positions A1', A2', A3' and A4' can be envisaged over the wheel revolution.

On the basis of these radial acceleration measurements, it is possible to draw a curve Acc'(t) of acceleration as a function of time as illustrated in FIG. 3B. The acceleration curve Acc'(t) is similar to the acceleration curve Acc(t) of FIG. 1B such as described previously. However, it is noted in FIG. 3A that the measurement positions A1', A2', A3' and A4' are phase-shifted by 45 degrees anticlockwise with respect to the measurement points A1, A2, A3 and A4 of FIG. 1A.

The values of the minimum and of the maximum of the radial acceleration in position A1' and A3' are not fixed and depend on the rotation speed of the wheel 20. Thus, the minimum and the maximum can only be determined locally at each wheel revolution and not in an absolute manner with respect to fixed value thresholds.

However, subsequent to the phase shift of the measurement positions A1', A2', A3' and A4' with respect to the measurement points A1, A2, A3 and A4, the values of the minimum and of the maximum of the radial acceleration in position A1' and A3' are attenuated with respect to the values of the minimum and of the maximum of the radial acceleration in position A1 and A3. Nonetheless, despite this attenuation, a numerical processing of the measurements of radial acceleration at the measurement positions A1', A2', A3' and A4' by a processor (not represented) of the electronic unit 10, nevertheless makes it possible to determine the values of the minimum and of the maximum of the radial acceleration in position A1' and A3'.

More generally, according to an aspect of the present invention, the radial acceleration sensor 12 of the first electronic unit 10 is mounted with an inclination lying in an angular span of 30 to 60 degrees with respect to a tangential plane of the wheel 20 in the clockwise or anticlockwise direction In the example of FIG. 3A, the support 11 is mounted tangentially to the wheel 20 and is perpendicular to the plane of the figure, that is to say parallel to the rolling axis of the wheel 20. The radial acceleration sensor 12 likewise disposed in a plane perpendicular to the plane of the figure (and parallel to the rolling axis of the wheel 20) but it is mounted at 45 degrees ($\alpha$) with respect to the plane containing the support 11. The plane of the radial acceleration sensor 12 is then pivoted by 45° (or some other value between 30° and 60°) with respect to an axis lying in the plane of the support 11 and parallel to the rolling axis of the wheel 20. Thus, the radial acceleration sensor 12 performs a radial acceleration measurement in a radial plane (that is to say perpendicular to the rolling axis of the wheel 20) but with an inclination of 45° with respect to the tangent to the wheel 20. However, in another implementation (not illustrated), the radial acceleration sensor 12 can be mounted at 45 degrees ($\alpha$) with respect to the plane of the rim 21, that is to say the plane perpendicular to the rolling axis of the wheel 20 (or plan of the figure). The plane containing the radial acceleration sensor 12 is then pivoted with respect to the support 11 by 45° (or some other value between 30 and 60°) around a tangential axis. The measured radial acceleration is thus inclined at 45° with respect to the plane of the rim 21.

It can be envisaged, in another implementation, that the radial acceleration sensor 12 is mounted pivoted twice at 45 degrees ($\alpha$), once with respect to a tangential axis of the support 11 and once with respect to an axis of the support parallel to the rolling axis of the wheel 20.

As illustrated in FIG. 4, a second electronic unit 10 according to an aspect of the invention is able to measure operating parameters, such as for example a pressure or a temperature, of a tire (not represented) mounted on a rim 21, the mounted assembly forming a wheel 20 of a vehicle (not represented).

In FIG. 4, the electronic unit 10 comprises the same elements as those described previously in regard to FIG. 3A. Nonetheless, in the example of FIG. 4, the radial acceleration sensor 12 is mounted parallel with respect to the plane of the support 11 of the electronic unit 10. However, in another implementation, not illustrated, the radial acceleration sensor 12 could be mounted perpendicular with respect to the plane of the support 11 of the electronic unit 10.

In this embodiment, the support 11 of the second electronic unit 10 is mounted inclined in an angular span of 30 to 60 degrees with respect to a plane tangential to the wheel 20 by pivoting around an axis parallel to the rolling axis. In the example of FIG. 4, the support 11 is mounted pivoted at 45 degrees (α) with respect to the tangent plane to the wheel 20 in the clockwise direction. However, in another implementation, the support 11 could be mounted at 45 degrees (α) in the anticlockwise direction. It could also be mounted inclined with respect to the plane tangential to the wheel 20 by being pivoted with respect to an axis contained in this tangential plane and in the plane of the rim.

This particular arrangement of the second electronic unit 10 makes it possible to obtain the same radial acceleration measurements at the measurement positions A1', A2', A3' and A4' and to draw the acceleration curve Acc'(t) of FIG. 3B such as described previously.

An aspect of the present invention relates furthermore to a system for checking the pressure of the tires of a vehicle comprising at least one electronic unit 10 such as described previously.

An aspect of the present invention relates furthermore to a system for checking the pressure of the tires of a vehicle comprising two electronic units such as described previously, a first electronic unit in which the radial acceleration sensor or the support is mounted inclined in an angular span of 30 to 60 degrees with respect to the tangential plane with respect to an axis of pivoting of this tangential plane parallel to the rolling axis of the wheel and a second electronic unit in which the radial acceleration sensor or the support is mounted inclined in an angular span of 30 to 60 degrees with respect to the tangential plane around an axis of this tangential plane also belonging to the plane of the rim, the first electronic unit and the second electronic unit being mounted on one and the same support inside a volume such as a sphere.

In an exemplary implementation, the system for checking the pressure of the tires of a vehicle comprises two electronic units 10 such as described previously. For example, such a system could comprise a first electronic unit 10 according to FIG. 3 in which the radial acceleration sensor 12 is mounted pivoted at 45 degrees with respect to the tangential plane with respect to an axis of pivoting of this tangential plane parallel to the rolling axis of the wheel and a second electronic unit 10 according to FIG. 3 in which the radial acceleration sensor 12 is mounted pivoted at 45 degrees with respect to the tangential plane around an axis of this tangential plane also belonging to the plane of the rim. In such an implementation, the first electronic unit 10 and the second electronic unit 10 could be positioned on one and the same support inside a volume such as a sphere. By virtue of such an arrangement, it is possible to place freely inside the wheel 20 without hampering the determination of the radial acceleration of the wheel 20. Indeed, whatever the position of this volume, one of the sensors of radial acceleration 12 could always determine the radial acceleration of the wheel 20.

Moreover, an aspect of the present invention relates to a wheel of a vehicle comprising at least one electronic unit 10 according to one of the embodiments described previously.

Figure 5:
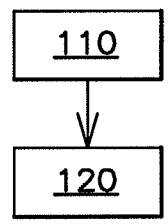
FIG. 5 is a logic diagram of a method of mounting a radial acceleration sensor in an electronic unit according to one embodiment of the invention.

An aspect of the invention relates, furthermore, to a method of mounting the radial acceleration sensor 12 in the electronic unit 10. FIG. 5 illustrates an embodiment of this mounting method.

In a first step 110 of the mounting method, the radial acceleration sensor 12 is mounted parallel or perpendicular to the support 11. Next in a second step 120 of the mounting method, the support 11 is mounted on the rim 21 by being pivoted between 30° and 60°, for example 45°, with respect to the plane tangential to the rim 21 at the level of the mounting position of the support, the pivoting of the support 11 with respect to the tangential plane being performed with respect to (at least) an axis contained in the tangential plane.

Figure 6:
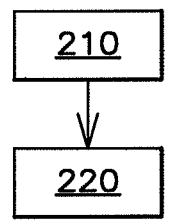
FIG. 6 is a logic diagram of a method of mounting an electronic unit according to one embodiment of the invention.

An aspect of the invention relates, also, to a method of mounting the electronic unit 10 in the wheel 20. FIG. 6 illustrates an embodiment of this mounting method.

In a first step 210 of the mounting method, the radial acceleration sensor 12 is mounted on the support 11 of the electronic unit 10 with an inclination of between 30° and 60°, for example 45° with respect to the plane of the support, clockwise or anticlockwise. Next in a second step 220 of the mounting method, the support 11 is mounted on the rim 21 while being in a substantially tangential or radial plane with respect to the rim 21 and its rolling axis.

In a variant embodiment of the present invention such as illustrated in FIG. 7, the first electronic unit 10 is arranged so that the support 11 is mounted on the rim 21 in a manner perpendicular to the plane of the rim 21 and to the tangential plane corresponding to its mounting position. In this particular mode of arrangement in which the support is disposed radially, the same results as those described previously for the first electronic unit 10 of FIG. 3 are obtained.

An aspect of the present invention thus allows the realization of a unique arrangement of the electronic unit facilitating the integration of a wheel unit in various ways without limitation.

Aspects of the invention then make it possible to reduce the costs related to the various modes of integration of a wheel unit in a vehicle wheel since it is no longer necessary to have several arrangements of the wheel unit to cover various modes of integration.

Aspects of the present invention can find applications in any type of motorized vehicle such as automobiles or motorbikes.

Of course, the aspects of the present invention is not limited to the preferred embodiment and to the variant embodiments presented hereinabove by way of nonlimiting examples. It also relates to the variant embodiments within the scope of the person skilled in the art within the framework of the claims hereinafter.

The invention claimed is:

1. An electronic unit for measuring operating parameters of a tire, said tire being mounted on a rim, the mounted assembly forming a vehicle wheel able to rotate about a rolling axis, said electronic unit comprising:
   a support adapted to be mounted on said wheel, said support forming a printed circuit on which is mounted a radial acceleration sensor able to measure radial accelerations of said wheel,
   wherein said radial acceleration sensor is mounted inclined in an angular span of 30 to 60 degrees with respect to a plane tangential to said rim.

2. The electronic unit as claimed in claim 1, wherein said support is mounted substantially parallel or perpendicular to a plane perpendicular to said rolling axis of said wheel.

3. An electronic unit for measuring operating parameters of a tire, said tire being mounted on a rim, the mounted assembly forming a vehicle wheel able to rotate about a rolling axis, said electronic unit comprising:
   a support adapted to be mounted on said wheel, said support forming a printed circuit on which is mounted a radial acceleration sensor able to measure radial accelerations of said wheel,
   wherein said support is mounted inclined in an angular span of 30 to 60 degrees with respect to a tangential plane of said rim.

4. The electronic unit as claimed in claim 3, wherein said radial acceleration sensor is mounted substantially parallel or perpendicular with respect to the plane of said support.

5. The electronic unit as claimed in claim 1, wherein said support or said radial acceleration sensor is mounted at 45 degrees with respect to a plane tangential to said rim.

6. A system for checking the pressure of the tires of a vehicle, comprising at least one electronic unit, said tires being mounted on respective rims, said electronic unit comprising:
   a support adapted to be mounted on said rim, said support forming a printed circuit on which is mounted a radial acceleration sensor able to measure radial accelerations of said rim,
   wherein said radial acceleration sensor is mounted inclined in an angular span of 30 to 60 degrees with respect to a plane tangential to said rim.

7. The system for checking the pressure of the tires of a vehicle as claimed in claim 6, further comprising two electronic units, a first electronic unit in which the radial acceleration sensor or the support is mounted inclined in an angular span of 30 to 60 degrees with respect to the tangential plane with respect to an axis of pivoting of this tangential plane parallel to the rolling axis of the wheel and a second electronic unit in which the radial acceleration sensor or the support is mounted inclined in an angular span of 30 to 60 degrees with respect to the tangential plane around an axis of this tangential plane also belonging to the plane of the rim, the first electronic unit and the second electronic unit being mounted on one and the same support inside a volume.

8. A vehicle wheel, comprising:
   at least one electronic unit and
   a support adapted to be mounted on said wheel, said support forming a printed circuit on which is mounted a radial acceleration sensor able to measure radial accelerations of said wheel,
   wherein said radial acceleration sensor is mounted inclined in an angular span of 30 to 60 degrees with respect to a plane tangential to said wheel.

9. A method of mounting a radial acceleration sensor able to measure radial accelerations of a vehicle wheel able to rotate about a rolling axis, said radial acceleration sensor being able to be mounted in an electronic unit for measuring operating parameters of a tire, said tire being mounted on a rim, the mounted assembly forming said wheel, said electronic unit comprising a support forming a printed circuit and adapted to be mounted on said wheel, the method comprising mounting said radial acceleration sensor with an inclination of between 30 and 60 degrees with respect to a plane tangential to said rim.

10. The method of mounting as claimed in claim 9, further comprising in mounting said support substantially parallel or perpendicular to a plane perpendicular to said rolling axis of said wheel.

11. A method of mounting an electronic unit for measuring operating parameters of a tire, said tire being mounted on a rim, the mounted assembly forming a vehicle wheel able to rotate about a rolling axis, said electronic unit comprising a support adapted to be mounted on said wheel, said support forming a printed circuit on which is mounted a radial acceleration sensor able to measure radial accelerations of said wheel, the method comprising mounting said support with an inclination of between 30 and 60 degrees with respect to a plane tangential to said rim.

12. The method of mounting as claimed in claim 11, further comprising mounting said radial acceleration sensor substantially parallel or perpendicular with respect to the plane of said support.

13. The electronic unit as claimed in claim 3, wherein said support or said radial acceleration sensor is mounted at 45 degrees with respect to a plane tangential to said rim.

14. A system for checking the pressure of the tires mounted on respective wheels of a vehicle, the system comprising:
   at least one electronic unit and
   a support adapted to be mounted on said wheel, said support forming a printed circuit on which is mounted a radial acceleration sensor able to measure radial accelerations of said wheel,
   wherein said support is mounted inclined in an angular span of 30 to 60 degrees with respect to a tangential plane of said wheel.

15. The system for checking the pressure of the tires of a vehicle as claimed in claim 7, wherein the volume is a spherical volume.

16. A vehicle wheel comprising:
   a support adapted to be mounted on said wheel, said support forming a printed circuit on which is mounted a radial acceleration sensor able to measure radial accelerations of said wheel,
   wherein said support is mounted inclined in an angular span of 30 to 60 degrees with respect to a tangential plane of said wheel.

* * * * *